United States Patent [19]
Saito

[11] Patent Number: 5,047,934
[45] Date of Patent: Sep. 10, 1991

[54] CONTROLLING DEVICE FOR AUTOMATIC SPEED CHANGE MECHANISM

[75] Inventor: Yoshitami Saito, Aichi, Japan

[73] Assignee: Aisin Seiki K.K., Aichi, Japan

[21] Appl. No.: 330,832

[22] Filed: Mar. 30, 1989

[30] Foreign Application Priority Data

Mar. 30, 1988 [JP] Japan .................................. 63-77479

[51] Int. Cl.⁵ ...................... B60K 41/18; G05D 17/02
[52] U.S. Cl. .................................. 364/424.1; 74/866;
280/707; 364/424.01
[58] Field of Search ........................ 364/424.01, 424.1;
74/866; 180/170; 280/707

[56] References Cited

U.S. PATENT DOCUMENTS

| 4,523,281 | 6/1985 | Noda et al. | 364/424.1 |
| 4,564,906 | 1/1986 | Stephan et al. | 364/424.1 |
| 4,630,508 | 12/1986 | Klatt | 364/424.1 |
| 4,669,749 | 6/1987 | Tanaka et al. | 280/707 |
| 4,788,892 | 12/1988 | Komoda et al. | 74/866 |
| 4,870,584 | 9/1989 | Etoh et al. | 364/424.01 |

Primary Examiner—Felix D. Gruber
Attorney, Agent, or Firm—Sughrue, Mion, Zinn, Macpeak & Seas

[57] ABSTRACT

A controlling device for automatic speed change mechanism is disclosed in which acceleration efficiency and fuel economy are simultaneously achieved. The device of the present invention is constructed such that plural sets of predetermined speed change programs are provided for indicating the relationship among the increase of driving power, that is, the opening degree of the throttle valve, the speed of the automobile and the speed change step. Based on the selected program information, the controlling of the speed change is carried out, while automobile height detection devices are provided for emitting electric signals corresponding to the distance between the surface of the road and the body of the automobile. Based on the height of the automobile body detected by the automobile height detecting device, a switch-over to a proper speed change program is carried out. Thus by switching over to a proper speed change program in response to the detected height of the automobile body, the most proper speed change step can be selected without aggravating the acceleration characteristics and the fuel economy.

6 Claims, 11 Drawing Sheets

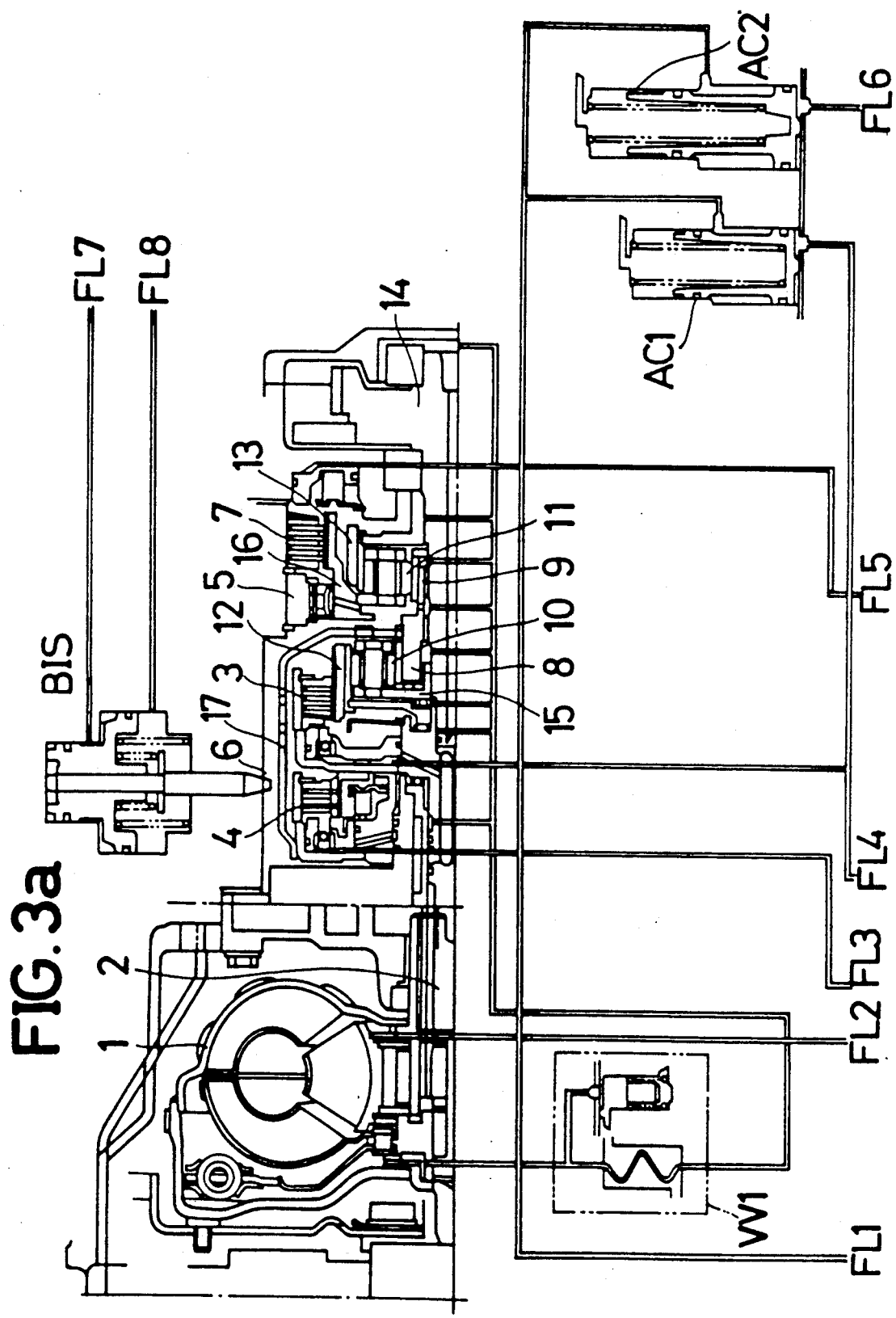

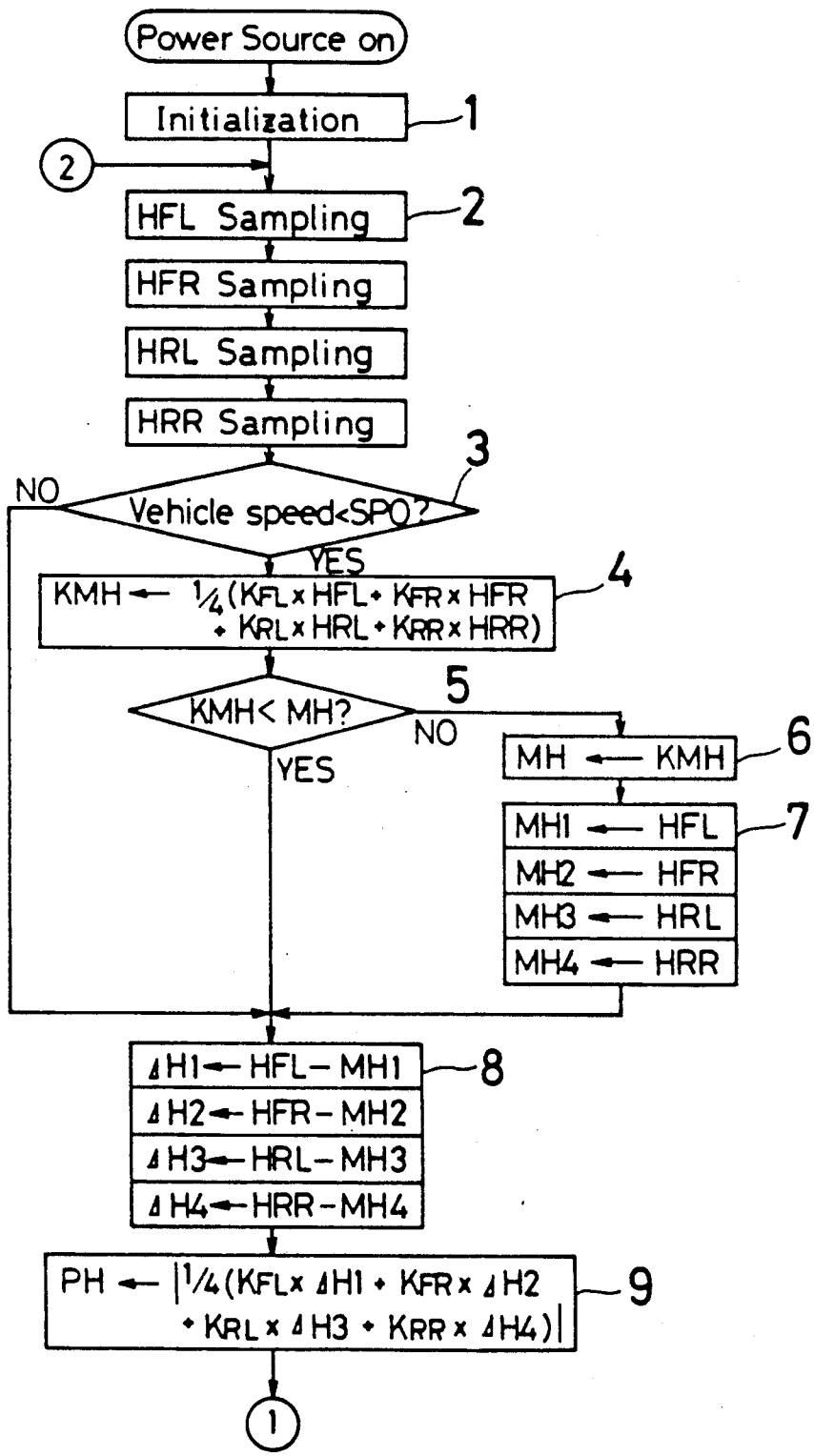

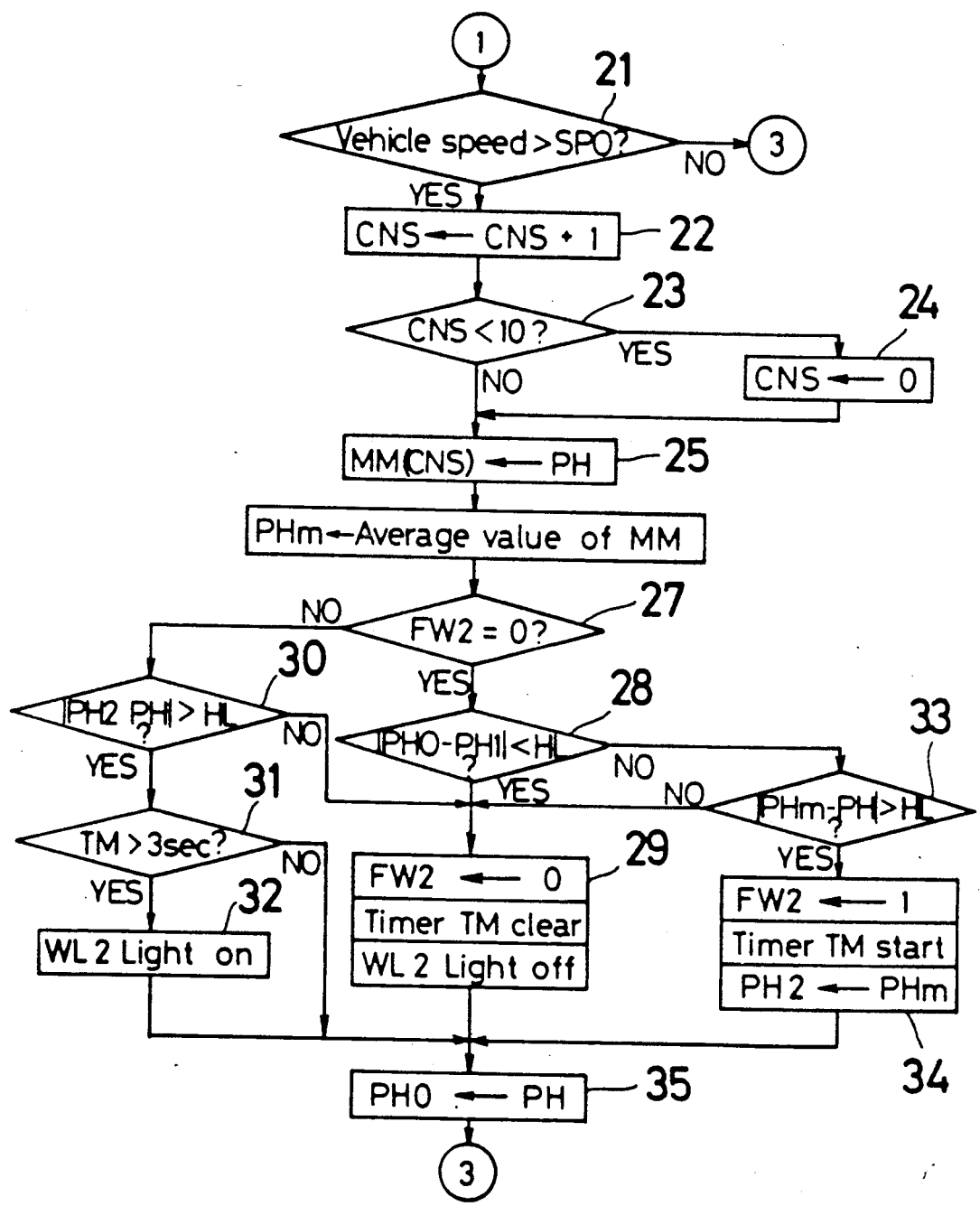

CONTROLLING DEVICE FOR AUTOMATIC SPEED CHANGE MECHANISM

The present invention relates to a controlling device for an automatic speed change mechanism used in automobiles and the like, and particularly to an automatic speed change controller in correspondence with large variations of the load.

BACKGROUND OF THE INVENTION

Generally in this type of speed change mechanism, a speed change program (speed change line) indicating the relationship between the speed of the automobile and the opening degree of the throttle valve is established in advance, and based on such a program, the pertinent speed change step is selected correspondingly with the speed of the automobile and the opening degree of the throttle valve. Therefore, in an automobile using this type of speed change mechanism, the running characteristics of the automobile are determined by the nature of the speed change program. Furthermore, an automatic speed change mechanism is also known in which multiple programs consisting of a program having superior fuel economy and a program having superior acceleration features are provided so that the driver can select the desired program through manipulation of manual switches.

However, if the program having the superior accelerating feature is chosen, the fuel economy is aggravated, while, if the program having the superior fuel economy is chosen, the accelerating characteristic is neglected. Furthermore, if the number of passengers varies, the load of the automobile is correspondingly varied, resulting in the variation of the accelerating characteristic. For example, even if a speed change program having relatively good fuel economy is chosen, if the load is very small, an adequate acceleration can be obtained, while if the load is very large, the acceleration characteristic is aggravated, thereby creating poor running conditions. Therefore, even in an automatic speed change mechanism having plural programs, the driver has to manipulate the conversion switches in response to the current situation and such manipulations of the switches are troublesome tasks. But in trucks and buses in which the variations of the load are very large, such switch-overs of the speed change programs are very effective in improving the fuel economy.

SUMMARY OF THE INVENTION

It is the object of the present invention to provide a controlling device for an automatic speed change mechanism in which a choice is made from among a plurality of speed change programs wherein, without manual manipulations of the switches, a proper speed change program can be automatically chosen in correspondence with the variations of the load.

In achieving the above object, the device of the present invention is constituted such that plural sets of predetermined speed change programs are provided for indicating the relationship between the addition of driving power, that is, the opening degree of the throttle valve, the speed of the automobile and the speed change step, and based on the selected program information, the controlling of the speed change is carried out, while an automobile height detection means is provided for emitting electric signals corresponding to the distance between the surface of the road and the body of the automobile, and based on the height of the automobile body detected by said automobile height detection means, switch-over to a proper speed change program is carried out.

Now the operation of the device according to the present invention will be briefly described. Generally, in an automobile, the automobile body is connected to the automobile axles through suspension means which are composed of elastic supporters such as coil springs or shock absorbers. Therefore, if the load of the automobile is changed, the height of the elastic supporters is changed, resulting in the height of the automobile body being changed. Therefore, if the vertical distance between the automobile axles and the automobile body is detected, the height of the automobile body which is the distance between the road surface and the automobile body can be determined.

The height of the automobile body is related to the load of the automobile. That is, if the load is small, the length of the suspension means becomes longer, thereby making the height of the automobile body higher, while if the load is large, the length of the suspension means is shortened, thereby making the height of the automobile body lower. Accordingly, it can be said that the variation of the height of the automobile body depends on the magnitude of the load. When the height of the automobile body is relatively high, it means that the load is small, and therefore, even if a relatively low speed change step is selected relative to the speed of the automobile, a sufficient acceleration can be obtained, while, when the height of the automobile body is relatively low, it means that the load is large, and therefore, sufficient acceleration cannot be obtained unless a relatively high speed change step is selected relative to the speed of the automobile.

Accordingly, if the speed change programs are switched over in response to the detected height of the automobile body, the most proper speed change step can be selected without aggravation of the acceleration characteristics or aggravation of the fuel economy even if the load is varied.

For example, if a large article falls out of the automobile during the running of the automobile, a sudden large variation of the load of the automobile occurs, thereby suddenly changing the height of the automobile body. In such a case, the embodiment of the present invention to be described below provides a warning system to give a warning to the driver upon detection of such a sudden variation of the height of the automobile body. Further, if the detected height of the automobile body is below a certain predetermined value, it is decided as an over-load state and, therefore, a warning is given to the driver.

BRIEF DESCRIPTION OF THE DRAWINGS

The above objects and other advantages of the present invention will become more apparent by describing the preferred embodiment of the present invention with reference to the attached drawings in which:

FIGS. 3a and 3b are block diagrams showing the arrangement of the hydraulic circuits used in the speed change mechanism of FIG. 2;

FIGS. 6a, 6b, 6c and 6d are flow charts showing the operations of the microcomputer (CPU) of FIG. 1;

DESCRIPTION OF THE PREFERRED EMBODIMENT

Figure 2:
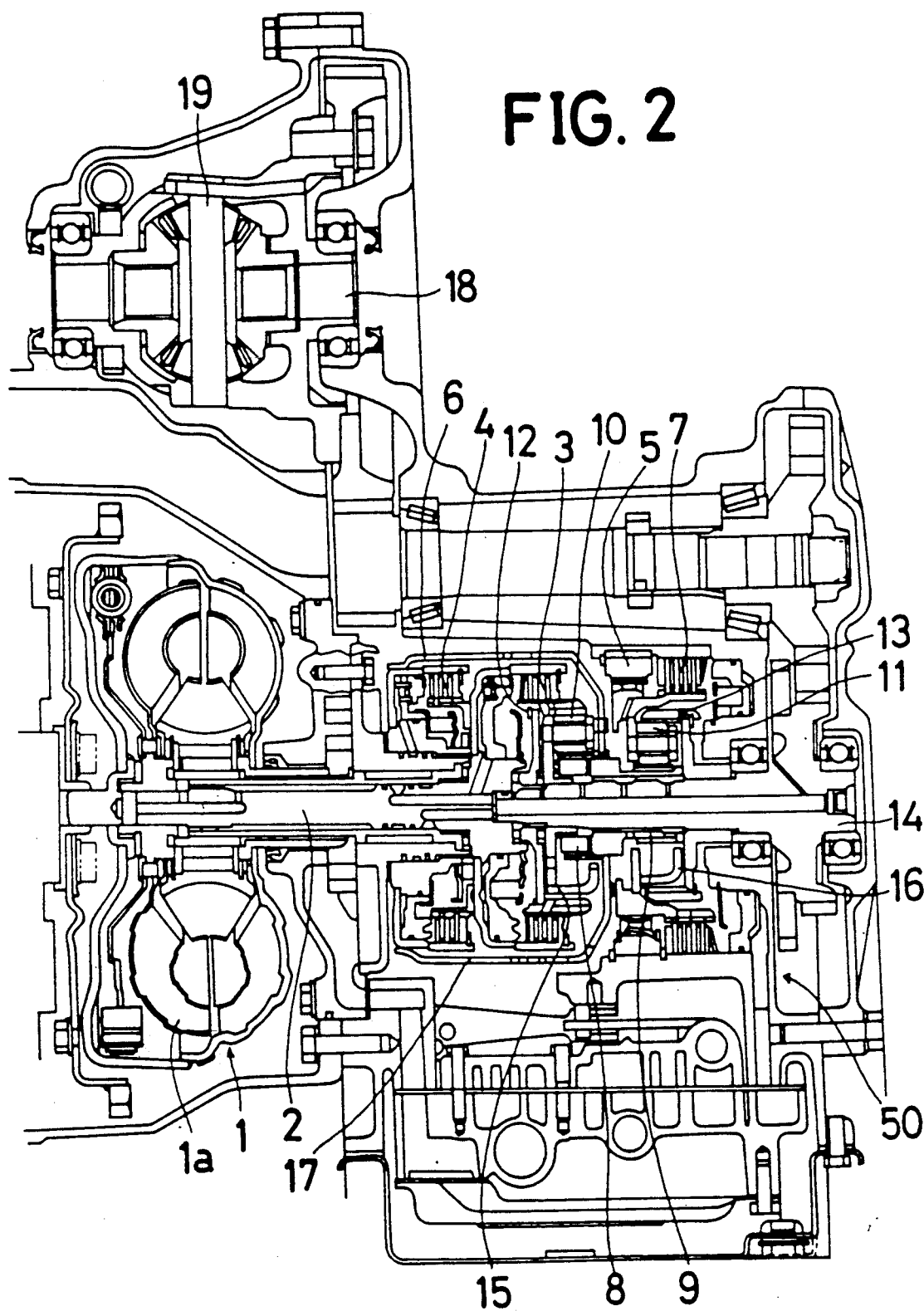
FIG. 2 is a frontal view showing the internal structure of the speed change mechanism.

FIG. 2 illustrates the construction of an automatic speed change mechanism according to the present invention for use in automobiles. The construction and the operation of this speed change mechanism will be described referring to FIG. 2. An engine crank shaft (not shown) is connected to a torque converter 1 having a turbine 1a, and the turbine 1a is connected to an input shaft 2 of a planetary gear unit 50. The planetary gear unit 50 comprises controlling components such as a front clutch 3, a direct clutch 4, a one way clutch 5, and brakes 6, 7; and gears such as a front sun gear 8, a rear sun gear 9, a front planetary gear pinion 10, a rear planetary gear pinion 11, a front planetary ring gear 12, and a rear planetary ring gear 13.

The front sun gear 8 and the rear sun gear 9 are integrally formed with each other and are disposed in such a manner that they can be freely rotated around an output shaft 14. The front planetary gear pinion 10 is meshed with the outer circumference of the front sun gear 8, while the rear planetary gear pinion 11 is meshed with the outer circumference of the rear sun gear 9. The front planetary ring gear 12 and the rear planetary ring gear 13 are respectively provided with inner teeth for meshing with the front planetary gear pinion 10 and the rear planetary gear pinion 11. Accordingly, the front planetary gear pinion 10 is disposed between the outer circumference of the front sun gear 8 and the inner circumference of the front planetary ring gear 12, in a meshed state with them, while the rear planetary gear pinion 11 is disposed between the outer circumference of the rear sun gear 9 and the inner circumference of the rear planetary ring gear 13, in a meshed state with them.

Special attention is directed to the fact that the description hereinafter will be made based on the assumption that the revolutions of the revolving components will be observed from the left side. First, the case in which the gear of the first speed (maximum reduction ratio) is selected will be described. In this state, the front clutch 3 is engaged, the direct clutch 4 is disengaged, and the brake 6 is in an OFF state. Therefore, the driving torque imposed on the input shaft 2 is transmitted through the front clutch 3 to the front planetary ring gear 12, making the gear 12 turn clockwise. Therefore, a clockwise revolving force is transmitted to a front carrier 15 which supports the front planetary gear pinion 10 which is in turn meshed with the gear 12. Meanwhile, the front sun gear 8 receives a counterclockwise revolving force from the pinion 10 and gives a counterclockwise revolving force to a rear carrier 16 which supports the pinion 11, in order to transmit a counterclockwise revolving force through the rear sun gear 9 to the rear planetary gear pinion 11. The one way clutch 5 is engaged upon rising of the counterclockwise revolutions to prevent the revolution of the rear carrier 16. Accordingly, the pinion 11 is made to revolve clockwise and the rear planetary ring gear 13 meshed therewith is driven in the clockwise direction. Because the front carrier 15 and the rear planetary ring gear 13 are engaged with the output shaft 14, this output shaft 14 is driven in the clockwise direction. In this case (first speed), the reduction ratio is 2.7.

Now the case in which the second speed gear is selected will be described. In this state, the front clutch 3 is engaged, the direct clutch 4 is disengaged, and the brake 6 is in an ON state. Accordingly, a clockwise driving torque imposed on the input shaft 2 is transmitted through the front clutch 3 to the front planetary ring gear 12 to turn the gear 12 clockwise. Therefore, a clockwise revolving force is transmitted to the front carrier 15 which supports the front planetary gear pinion 10 which is in turn meshed with the gear 12. Meanwhile, the front sun gear 8 receives a counterclockwise revolving force from the pinion 10, but the revolution of the front sun gear 8 is prevented due to the function of the brake 6, thereby keeping the revolving force from being transmitted to the rear planetary gear pinion 11. Accordingly, due to the revolution of the front carrier 15 around which the front planetary gear pinion 10 revolves, a driving force is transmitted to the output shaft 14 to turn it clockwise. In this case (second speed), the reduction ration is 1.5.

Now the case in which the third speed gear is selected will be described. In this case, both the front clutch 3 and the direct clutch 4 are engaged. Accordingly, the front sun gear 8 and the front planetary ring gear 12 are driven at the same speed with each other, and therefore, the front planetary gear pinion 10 is in a locked state. Therefore, the front carrier 15 revolves with the same speed as the input shaft 2 and the output shaft 14 also revolves with the same speed as the input shaft 2. In this case, the reduction ration becomes 1.

Now the case in which the reverse gear is selected will be described. In this case, the front clutch 3 is disengaged, the direct clutch is engaged and the brake 7 is put in an ON state. Therefore, a clockwise driving torque imposed on the input shaft 2 will be transmitted through a drum 17 to the rear sun gear 9. Accordingly, a clockwise revolving force will be applied to the rear carrier 16 which supports the rear planetary gear pinion 11. Due to the function of the brake 7, the revolution of the rear carrier 16 will be prevented. Therefore, the rear planetary gear pinion 11 is made to revolve counterclockwise, thereby making the rear planetary ring gear 13 driven in the counterclockwise direction. Accordingly, the output shaft 14 which is coupled with the pertinent gear 13 is driven in the counterclockwise direction. That is, the speed change mechanism of FIG. 2 can be operatively connected to be in a disconnected state, three forward running reduction connections or one reverse driving reduction connection.

Figure 3B:
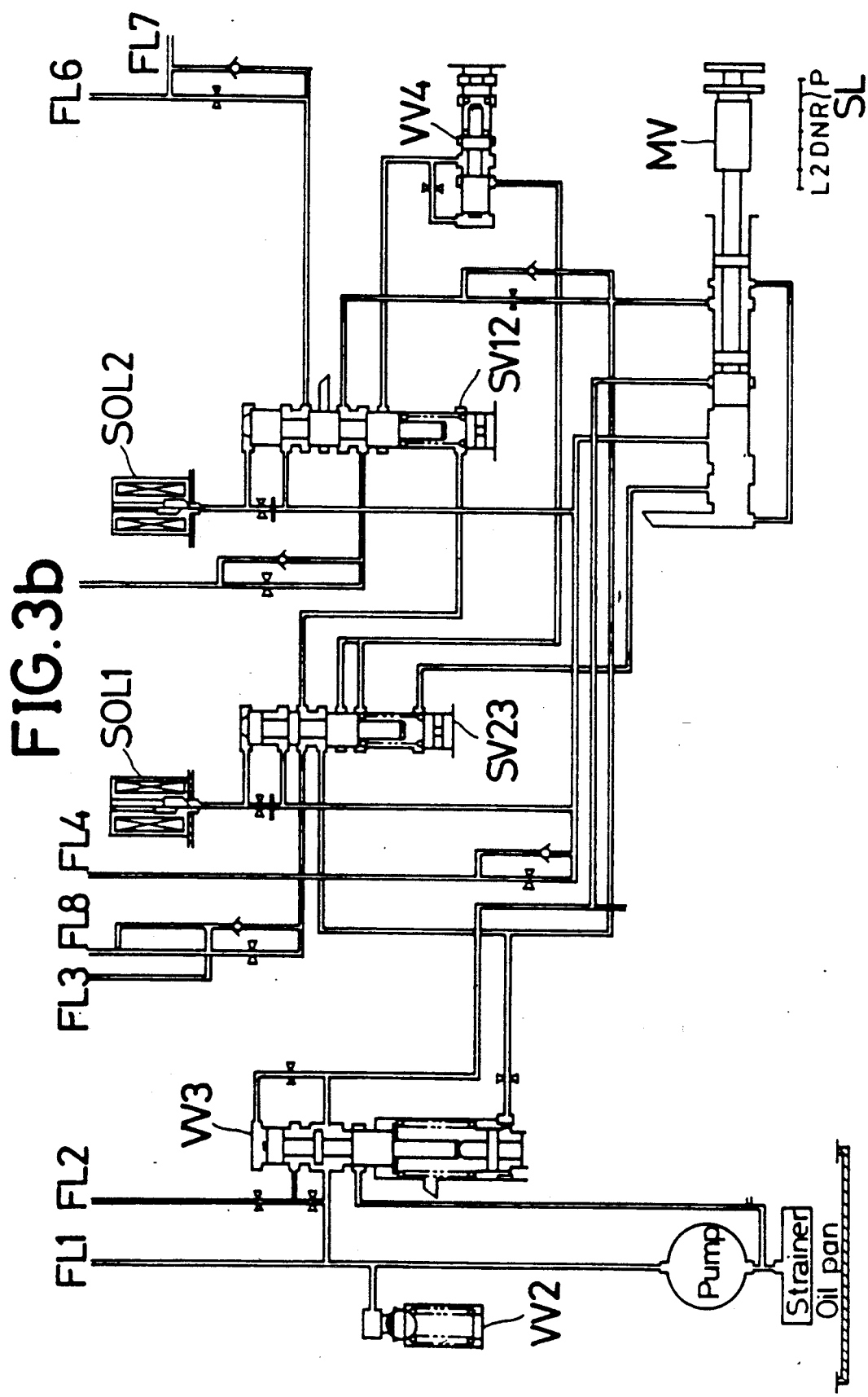

FIGS. 3a and 3b illustrate the construction of the hydraulic circuit for controlling the speed change mechanism of FIG. 2. Referring to the drawings, this hydraulic circuit comprises a cooler bypass valve VV1, a pressure relief valve VV2, a primary regulator valve VV3, a low cost modulator valve VV4, 1-2 speed shift valve SV12, a 2-3 speed shift valve SV23, shift control solenoid valves SOL1, SOL2 and a manual valve MV.

Reference code BIS indicates a servocontrol constituting the brake 6.

The manual valve MV is operated in an interlocked state with a shift lever SL for commanding the speed change, the shift lever being disposed near the driver's seat and said manual valve MV is provided with 6 ranges: P, R, N, D, 2 and L. This hydraulic circuit is constructed such that the above described speed change mechanism is controlled by means of the combined functions of the selected range of the manual valve MV and the ON/OFF state of the shift control solenoid valves SOL1, SOL2.

The above described speed change mechanism and the hydraulic circuit are substantially the same as a conventional one and therefore, no further detailed descriptions will be made.

Figure 1:
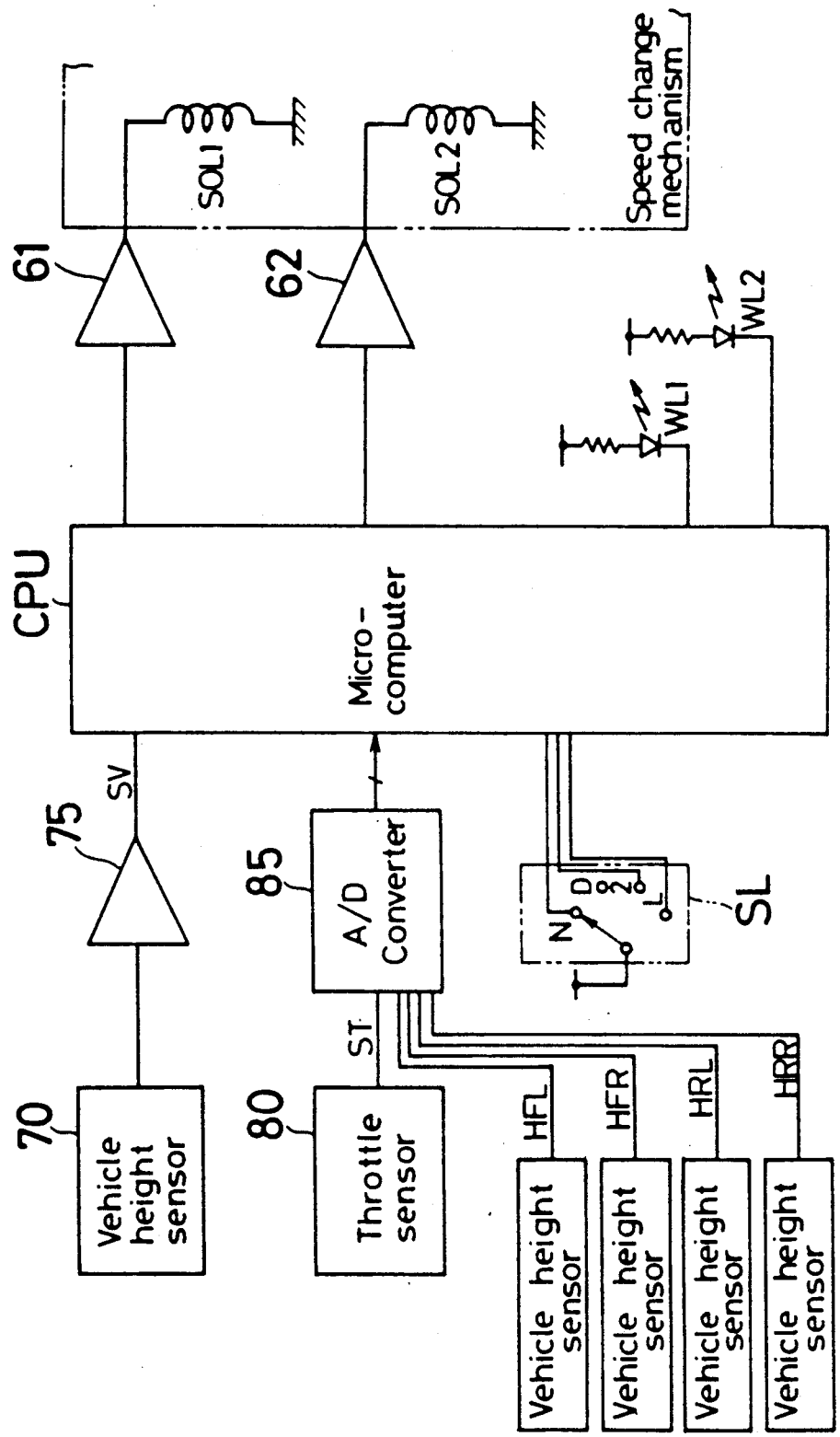
FIG. 1 is a block diagram showing the electric circuit portion of the speed change controller according to the present invention.

The construction of the electric circuit for controlling the hydraulic circuit which is illustrated in FIGS. 3a and 3b is shown in FIG. 1. Referring to FIG. 1, a microcomputer (CPU) is installed for controlling the shift control solenoid valves SOL1, SOL2. The solenoids of the shift control solenoid valves SOL1, SOL2 are connected through the drivers 61, 62 to the output ports of the microcomputer (CPU).

An automobile speed sensor 70 emits pulse signals in a number corresponding to the revolutions of the speed meter cable. Accordingly, if the frequencies of the pulse signals are measured, the speed of the automobile can be determined. The output terminal of the speed sensor 70 transmits the automobile speed signal SV through a signal processing circuit 75 to an input port of the microcomputer (CPU). A throttle sensor 80 emits analogue type electric signals corresponding to the opening degree of the throttle valve. These throttle opening degree signals ST are converted to digital signals by means of an A/D converter 85 and supplied to an input port of the microcomputer (CPU). Three signals emitted from the shift switch SL which is interlocked with the shift lever SL (FIG. 3b) are supplied to an input port of the microcomputer (CPU). Therefore, the microcomputer (CPU) can detect which range the shift lever is set to among the ranges N (neutral), D (drive), 2 (second speed) and L (first speed). Attention should be given to the fact that the first and second speeds of the ranges of the shift lever and the first and second speeds of the speed change mechanism are different from each other. This controlling device is provided with four automobile height sensors 91, 92, 93 and 94. The analogue electric signals HFL, HFR, HRL and HRR emitted by these automobile height sensors are converted to digital signals by means of the A/D converter 85 and supplied to the microcomputer (CPU). In this embodiment, it is assumed that the automobile body positions at the four wheels are respectively suspended by means of independent suspension devices and the shock absorbers as a part of the suspension devices are disposed respectively between each axle and the automobile body. Each of the automobile height sensors 91 to 94 is provided for each shock absorber constituting a part of the suspension device and is comprised of the pressure sensor associated with each shock absorber. Each pressure sensor emits a signal analogous to the height of the automobile and therefore is referred to as an automobile height signal. That is, the automobile height signals HFL, HFR, HRL and HRR indicate respectively the heights of the automobile body at the left front wheel, at the right front wheel, at the left rear wheel and at the right rear wheel.

Figure 4:
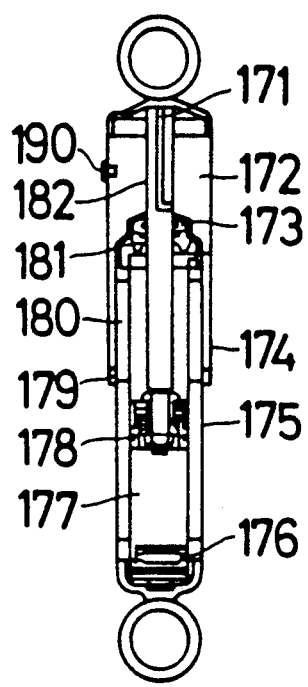
FIG. 4 is a frontal view of the internal structure of the shock absorber used in detecting the height of the automobile body.

FIG. 4 illustrates the construction of one unit of the shock absorber. Referring to FIG. 4, the shock absorber is constructed essentially as a twin tube type which is known conventionally. Reference number 171 indicates an air hole, 172 an air chamber, 173 a seal, 174 a tube, 175 a reservoir, 176 a base valve section, 177 the oil, 178 a piston portion, 179 a seal, 180 the air, 181 a rod guide and 182 a rod. Reference numeral 190 indicates a pressure sensor installed especially for detection of the height of the automobile body. That is, the pressure sensor 190 emits automobile height signals.

Figure 7A:
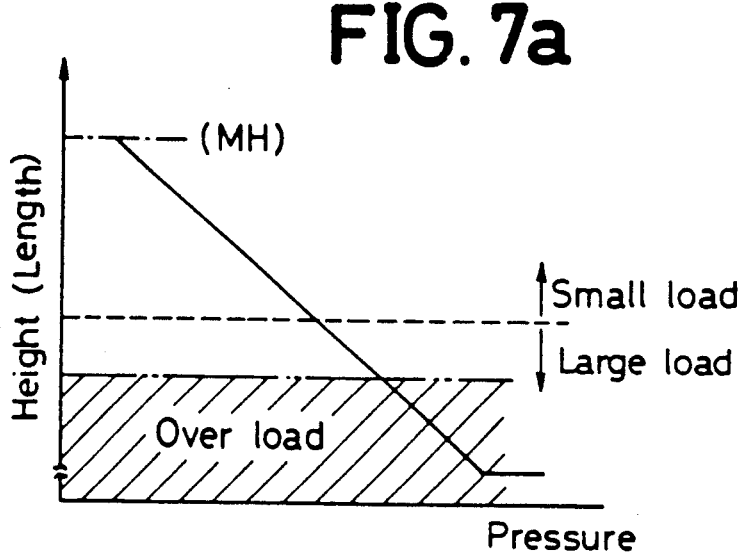
FIG. 7a is a graph showing the relationship between the detected pressure of the pressure sensor 190 and the length of the shock absorber.

When the shock absorber is extended, the air chamber 172 is open to the outside through the air hole 171 while, when it is contracted, the air hole 171 is closed. If this shock absorber is installed between the axle and the automobile body, its air chamber is sealed due to the force it receives in the axial direction. If the height of the automobile body is varied, the two tubes move relatively to each other resulting in the length of the shock absorber being varied and the volume of the air chamber 172 is also correspondingly varied. The quantity of the air within the air chamber 172 is constant and therefore, the air pressure is varied correspondingly with the variation of the volume of the air chamber. Accordingly, the pressure value detected by the pressure sensor 190 is determined by the length of the shock absorber, or the height of the automobile body. The relationship between the length of the shock absorber and the detected pressure is illustrated in FIG. 7a.

The light emitting diodes WL1, WL2 connected to the microcomputer (CPU) as shown in FIG. 1 are for giving a warning in an abnormal state. That is, the diode WL1 is lighted when the rated load is exceeded, while the diode WL2 is lighted when there is a possibility that some of the cargo has fallen off during the running of the automobile. Alternatively, only the diode WL1 can be provided in such a manner that it can have the functions of being lighted upon exceeding of the rated load and also being lighted upon occurrence of the possibility of cargo falling off.

FIGS. 6a, 6b, 6c and 6d illustrate schematically the operation of the microcomputer of FIG. 1. The operations of the microcomputer (CPU) will be described below referring to each of the drawings. First, referring to FIG. 6a, upon turning on the power source, the initialization is completed. That is, the contents of the internal memory are cleared, the output port is initialized, various parameters are also initialized and a timer or interrupt mode is established.

At step 2, the analog height signals HFL, HFR, HRL and HRR emitted by the respective automobile height sensors are subjected to samplings and are converted to digital height sequels by means of the A/D converter 85 and the digital signals for each detected automobile height are stored in the memory.

At step 3, the current automobile speed as measured by the speed signal SV is compared with a reference value SPO. If the current speed is less than SPO, that is, if the automobile speed is very slow or if the automobile is actually stopped, the operation is advanced to step 4, while, if the automobile is running, the operation is skipped to step 8.

At step 4, the presumed average values of the current automobile heights HFL, HFR, HRL and HRR in which the variation rates of the respective suspension devices (coefficients of KFL, KFR, KRL and KRR) are reflected are stored into the KMH.

At step 5, the current average automobile height value KMH is compared with the stored average automobile height value MH. If KMH is smaller than MH, the operation is transferred to step 8 and otherwise, the operation is advanced to step 6.

At step 6, the current presumed average automobile height value KMH is stored into the stored average automobile height value MH. That is, the highest average automobile height value until then, i.e., the average automobile height value under the smallest load is recorded in the memory MH. However, the momentary variations of the automobile height due to the vibrations of the automobile are disregarded.

Step 7 is carried out when the stored average automobile height value is renewed. When KHM is stored in MH, the automobile height value HFL at the left front wheel is stored in the memory MH1, the automobile height value HFR at the right front wheel is stored in the memory MH2, the automobile height value HRL at the left rear wheel is stored in the memory MH3 and the automobile height value HRR at the right rear wheel is stored in the memory MH4.

At step 8, the automobile height variation corresponding to the variation of the load is obtained. That is, the differences or variations of the automobile height between the current automobile heights HFL, HFR, HRL and HRR and the stored automobile heights MH1, MH2, MH3 or MH4 are stored in the memory H1, H2, He and H4. At step 9, the average height variation values in which the variations of the suspension devices are reflected at the respective positions are calculated and the results are stored in PH. When the automobile is stopped, the operation of the CPU is advanced from step 1 to step 21 of FIG. 6b and to step 41 of FIG. 6c to step 49. At step 49, the current automobile height PH is compared with MH/2 to decide the magnitude of the load. In this embodiment, the discriminating standard for the magnitude of the load is the contraction of the shock absorber into a half compared with its length under the smallest load. If PH < MH/2, that is, if the load is large, the operation is transferred to step 50 where load flag is set to 1, and if otherwise, the operation is advanced to step 51 where the pertinent flag FH is cleared to 0.

At step 52, as at step 49, the current automobile height (varied height) is decided to detect the absence or existence of an excessive load. In this embodiment, if the length of the shock absorber is contracted into less than one-third compared with its length under the smallest load, then it is decided that the rated load is exceeded. If PH < MH/3, that is, the actual load exceeds the rated load, the operation is transferred to step 53 where the warning device WL1 is lighted, and if otherwise, the operation is transferred to step 54 to de-energize the warning device WL1. Therefore, in an automobile using the device of the present invention, the existence of an over-load can be brought to attention through the lighting of the warning device WL1.

Figure 6C:
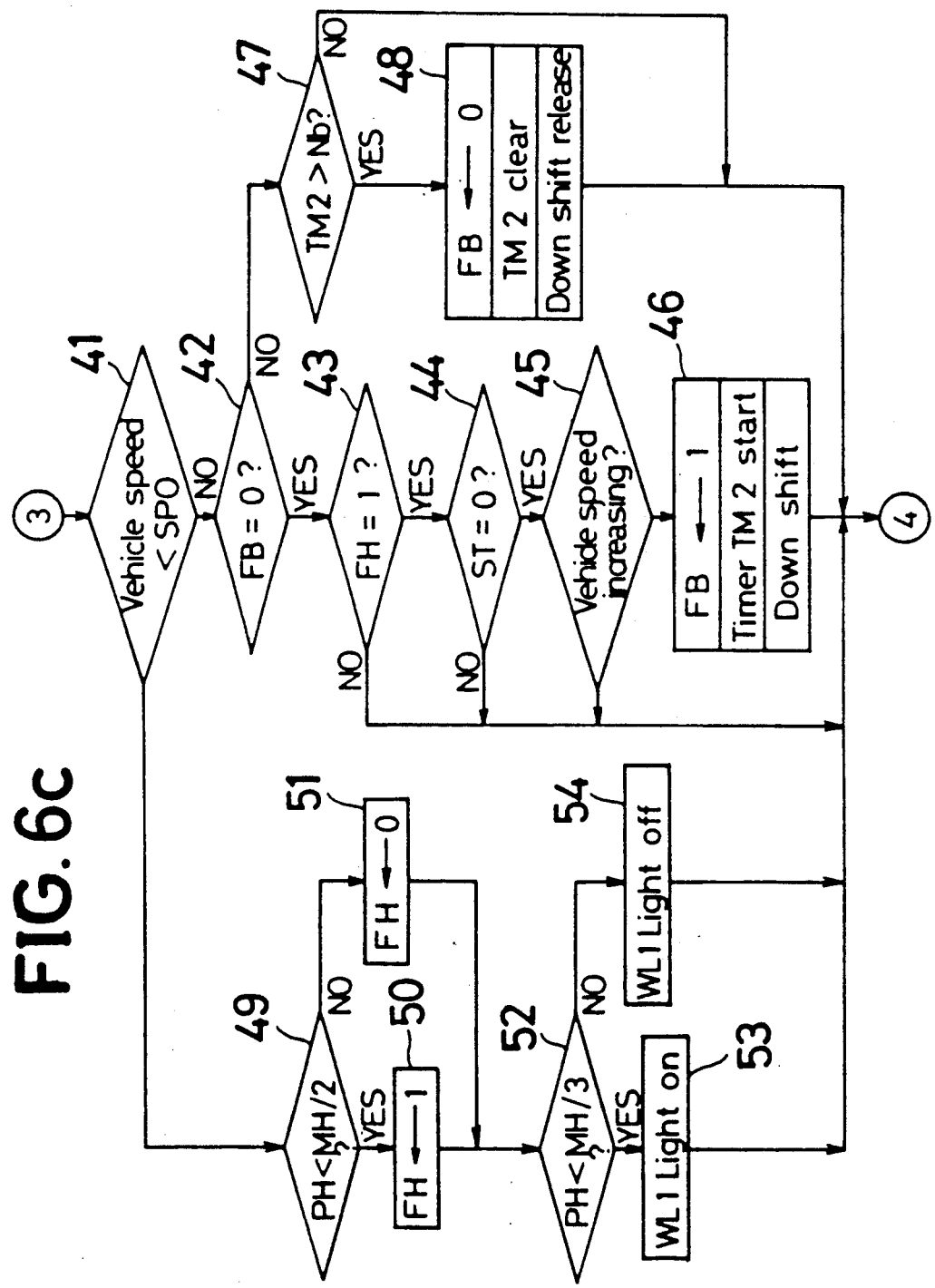
Figure 6D:
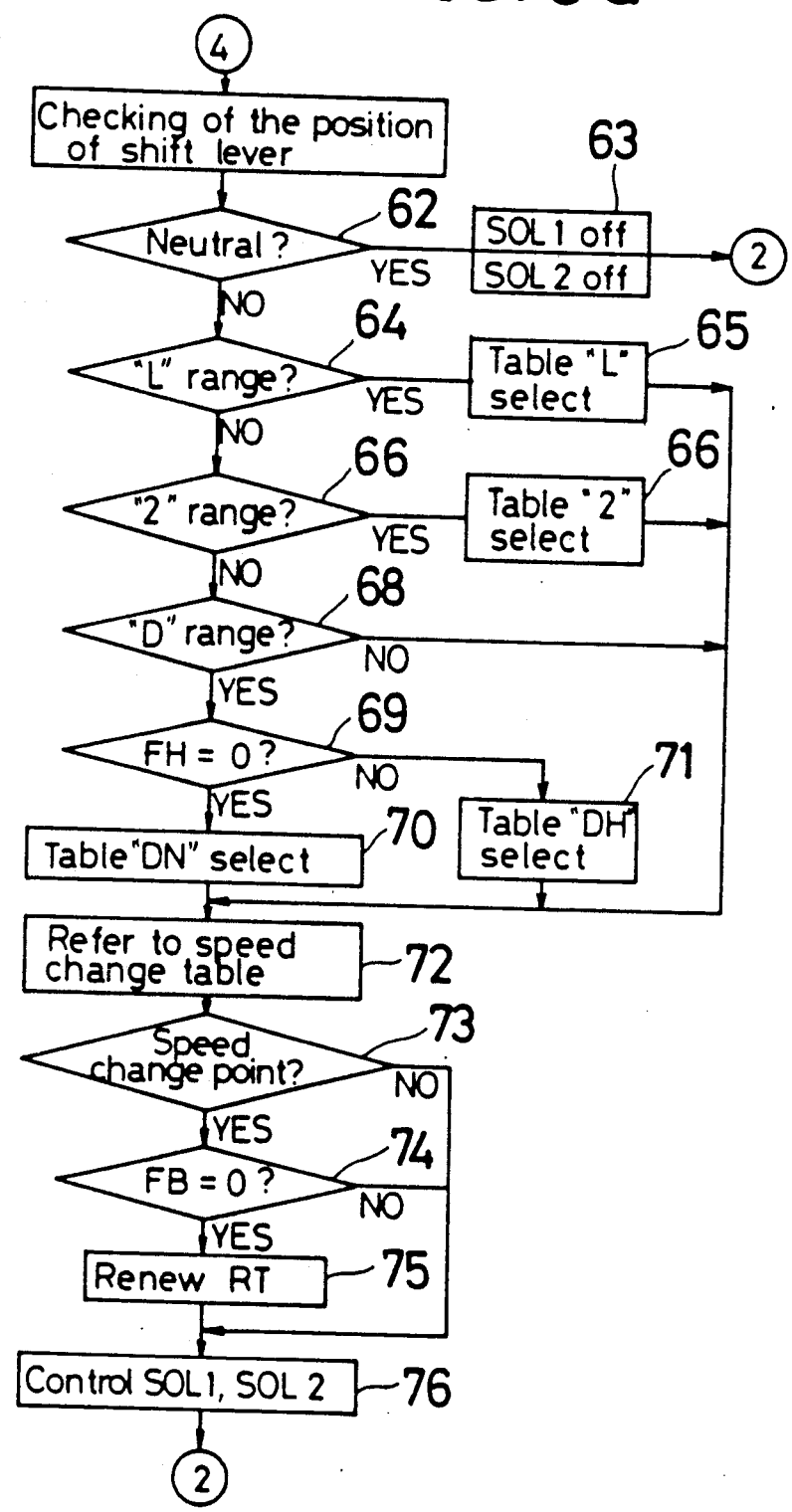

Then the operation will advance to step 61 of FIG. 6d, in which the operation is concerned about the controlling of the speed changes. In this device, the speed change step is selected corresponding to the current automobile speed and the opening degree of the throttle valve, but the information defining the relationship between these two factors is stored in the ROM of the microcomputer (CPU) in the form of a speed change table. Two such speed change tables are available for the "D" range, one such table for the "2" range and one such table for the "L" range of the shift lever.

Figure 5A:
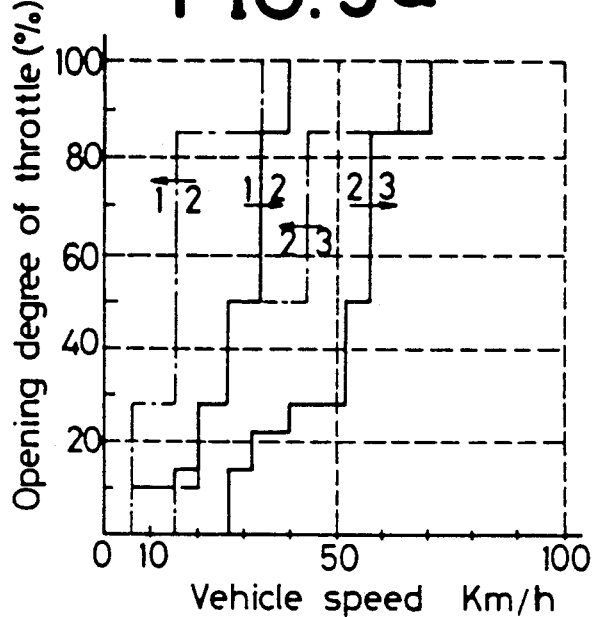
FIGS. 5a, 5b, 5c and 5d are graphs showing the relationship between the opening degree of the throttle, the automobile speed, and the selected gear in the respective speed change mode.
Figure 5B:
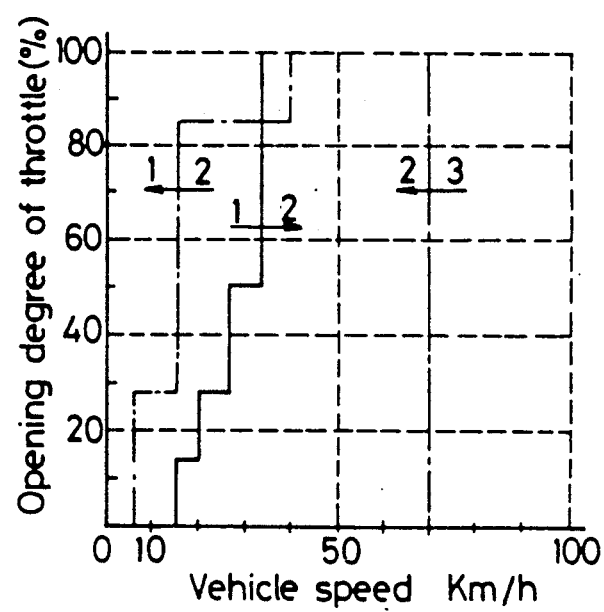
Figure 5C:
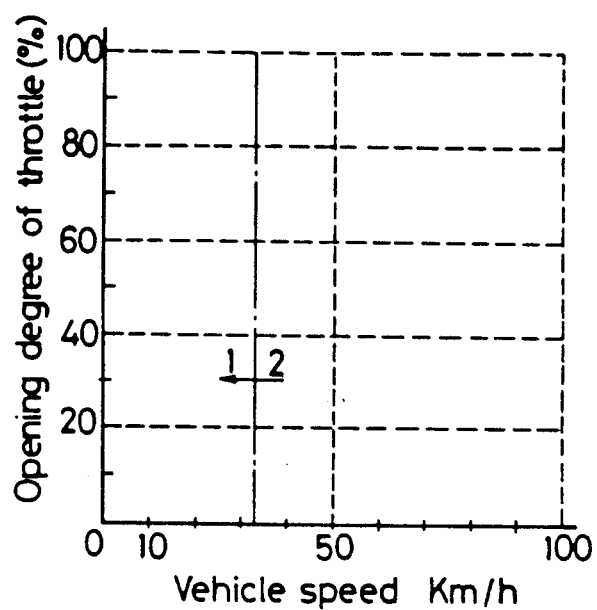
Figure 5D:
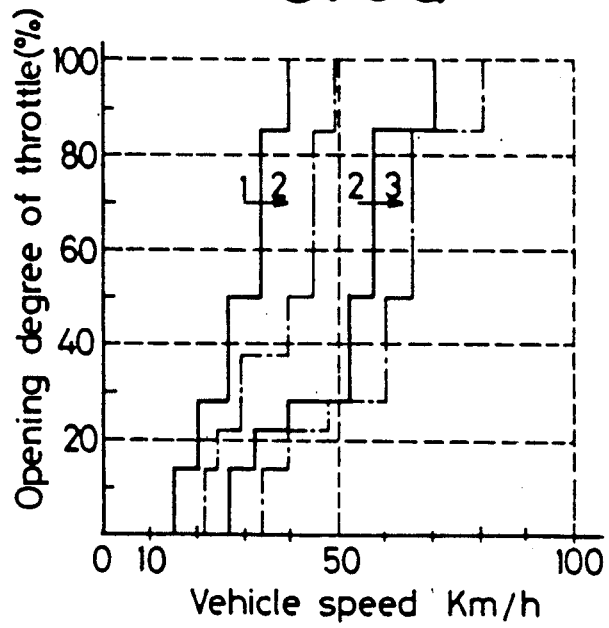

FIGS. 5a, 5b and 5c are graphs respectively showing the contents of the speed change tables for the "D" range, the "2" range and for the "L" range when the load is very small. In each graph of the drawings, the solid line shows the information needed when a switch is made from a low speed gear to a high speed gear, while the dotted line shows the information needed when a switch is made from a high speed gear to a low speed gear. FIG. 5d shows the difference between the contents of two tables for the "D" range. The solid line of FIG. 5d shows the contents of the table "DN" for a small load "D" range, while the dotted line shows the table "DH" for a large load "D" range. Accordingly, compared with the case where the controlling of the speed change is carried out under a small load, if the controlling of the speed change is carried out under a large load, a gear with a relatively small reduction ratio relative to the automobile speed is selected, and therefore, even with the same opening degree of the throttle, a large torque can be obtained, thereby improving the accelerating characteristics. If the controlling of the speed change is carried out under a small load, it means that the engine is used under a slow revolution speed and therefore, the fuel economy is improved. FIG. 5d shows only the information needed when a switch is made from a low speed gear to a high speed gear.

At step 61, the position of the shift lever is decided for selecting the range of speed change by referring to the signals emitted from the switch SL. If the shift lever is set to the neutral range, then the function of step 63 is carried out and both solenoid valves SOL1, SOL2 are set to OFF thereby setting the speed change mechanism at neutral. If the shift lever is set to the "L" range, function step 65 is carried out to select the speed change table "L", while if the shift lever is set to "2" range, the function of step 67 is carried out to select the speed change table "2". If the shift lever is set to the "D" range, the state of a load flag FH is checked at step 69. If the load flag FH is 0, that is, if the load is very small, the operation is advanced to step 70 where the speed change table "DN" is selected. At step 72, one of the speed change tables which have been selected at steps 65, 67, 70 or 71 is referred to. At step 73, a decision is made as to whether the current automobile speed and the opening degree of the throttle require a speed change or not in light of the contents of the speed change table. If it corresponds to a point on the speed change table requiring a speed change, then step 75 is carried out and, based on the contents of the speed change table, the content of the memory RT indicating the speed change step to be selected is renewed.

However, if the braking flag FB is 1, step 75 is not carried out. At step 76, based on the contents of the speed change memory RT, the data DS for controlling the solenoid valves SOL1, SOL2 are formed and said data are fed to the pertinent output port in order to control the valves SOL1, SOL2 to ON/OFF. Such operation is carried out referring to the conversion table stored in the memory. The contents of this conversion table are as shown in Table 1 below.

TABLE I

| RT | DS | |
|---|---|---|
| Speed change step | (SOL1) | (SOL2) |
| 1 | 1 (ON) | 0 (OFF) |
| 2 | 1 (ON) | 1 (ON) |

TABLE I-continued

| RT Speed change step | DS (SOL1) | (SOL2) |
|---|---|---|
| 3 | 0 (OFF) | 1 (ON) |

Figure 7B:
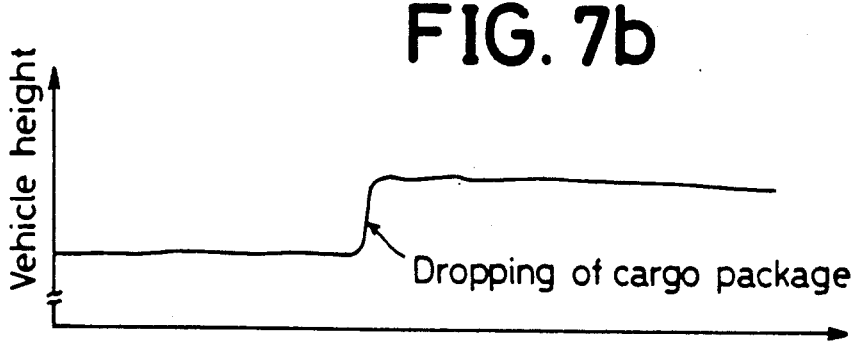
FIGS. 7b and 7c are wave forms showing the variations of the detected height of the automobile body in different situations.
Figure 7C:
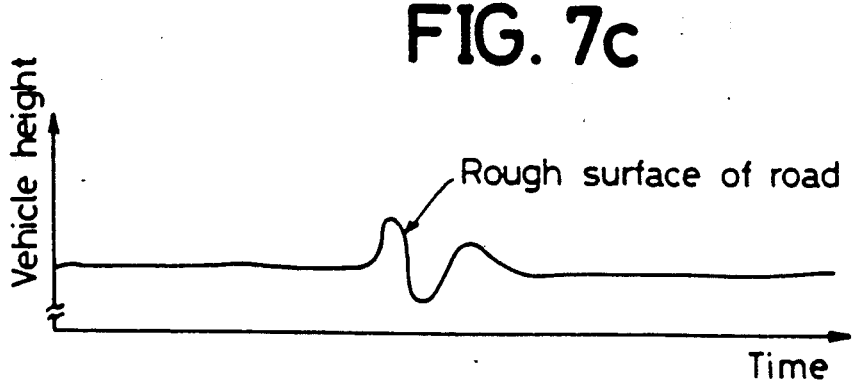

Now the process of FIG. 6b will be described. In this operation, the falling off of any package during the running of the automobile will be investigated. If there is any falling off of any package during the running of the automobile, the load will be abruptly reduced and therefore, there will be a sudden increase of the automobile height as shown in FIG. 7b. If such an abnormality is detected, it will be reported. At step 22, the counter CNS is incremented, and at step 23, CNS is compared with 10 which is the upper limit value. If CNS exceeds 10, it is cleared to 0. At step 25, the automobile height value PH is stored into the buffer memory MM (CNS) corresponding to the value of the counter CNS. In this embodiment, 10 data zones are assigned in the buffer memory MM in such a manner that the buffer memory should keep the 10 preceding up-to-date data for the automobile height PH. At step 26, an average value of the 10 preceding PH values is obtained based on the contents of the buffer memory MM and this value is stored in the memory PHm. At step 27, the state of the warning flag FW2 is investigated. Usually, since the warning flag FW2 is cleared to 0, the operation is advanced to step 28. At step 28, the difference between the preceding automobile height PH kept in the memory PHO and the current automobile height PH is compared with the reference value HL. In this case, the operation is usually advanced to step 29 but, if there is a sudden variation of the automobile height due to a falling off of a package or due to severe vibrations, the operation is transferred to step 33.

At step 33, the difference between the average automobile height stored in the memory PHm and the current automobile height PH is compared with the reference value HL. If the difference is very large, the possibility of existence of a package falling off is large and therefore, step 34 is carried out. If otherwise, the operation is transferred to step 29. At step 34, the warning flag FW2 is set to 1, the timer TM is started and the content of the memory PHm is stored in the memory PH2.

At step 35, the PH value is stored in the memory PHO. If the warning flag FW2 is set to 1, the operation is transferred from step 27 to step 30. At step 30, the difference between the current automobile height PH and the average automobile height PH2 under the condition of setting the flag FW2 to 1 is compared with the reference value HL. If the difference is very large, the operation is advanced to step 31 and a check is made as to whether the value of the timer TM reads more than 3 seconds.

In the case where a package has fallen as shown in FIG. 7b, the changed automobile height is not restored to the original height while, in the case where the automobile body is severely vibrated due to the roughness of the road surface, the varying automobile height will be restored to the original height. In the former case, the operation of FIG. 6b is such that step 34 is carried out against the sudden variation of the automobile height and notwithstanding, because the difference between PH2 and PH is not reduced during the time the timer TM counts 3 seconds, step 32 is carried out to light the warning device WL2. In the latter case, the operation of FIG. 6b is such that after step 34 is carried out against the sudden variation of the automobile height, the automobile height PH will be restored to the original height PH2 before the time TM counts 3 second and therefore, step 29 will be carried out, the flag FW2 will be cleared to 0, the time TM will be cleared and the warning device WL2 will be de-energized.

Now a description will be made referring to FIG. 6c. If the automobile is running, the operation will be advanced from step 41 to step 42. At step 42, a check will be made about the state of the braking flag FB. At first, as the flag FB is in a state cleared to 0, the operation is advanced to step 43. At step 43, a check is made as to the state of the load flag FH and if the load flag FH is set to 1 (large load), the operation is advanced to step 44. If the opening degree of the throttle is 0, and if the automobile speed is increasing, it means that the automobile is running on a downwardly inclined road and therefore, it is decided that the driver has no intention of accelerating the automobile. In this case, the operation is advanced through steps 44 and 45 to step 46, the braking flag is set to 1, the timer TM2 is started and a down shift has carried out. For example, if the speed change mechanism is in the process of selecting the third speed, a down shift is made to the second speed to increase the braking of the engine brake.

If the braking flag FB is set to 1, the operation is transferred from step 42 to step 47 and a check is made as to the content of the timer TM2. If the value of the timer TM2 falls short of the predetermined time Nb, the existing state (braking state) is maintained. If the value of the timer TM2 exceeds the predetermined time Nb, the operation is advanced to step 48, the braking flag FB is cleared to 0, the timer TM2 is also cleared and the down shift is released.

If the braking flag FB is set to 1, the renewal of the speed change register RT of step 75 as shown in FIG. 6d is prevented, but if the flag FB is returned to 0, step 75 is carried out resulting in the down shift being released and a speed change rear is selected based on the speed change table. In this embodiment, if the opening degree of the throttle is 0 and if the automobile speed is increasing under a large load, the speed change mechanism is down-shifted for as much as the predetermined time Nb to increase the braking of the engine brake to more than the usual.

Further, in the case where a lock up clutch is provided in the speed change mechanism, setting it to a direct connection will give a greater braking power and therefore, such controlling can be carried out when the braking flag FB is set to 1. In the embodiment described above, a pressure sensor is provided to the shock absorber as a means for detecting the automobile height, but other kinds of detecting means can be used. For example, if a potentiometer is attached to the actuation portion of the shock absorber, the length of the shock absorber can be detected as in the case where the pressure sensor is provided Further, a ring can be provided between the automobile body and the axles in such a manner that the height of the automobile body can be detected from the variation of the inclination of the pertinent ring.

Further, in the embodiment described above, the four heights of the automobile at the four axles are detected and their average value is controlled. The present invention can be practiced by installing only one height detecting means. Further, for example, in an automobile in which most variations of the load occur at the rear wheels, the height detection means can be installed only at the left rear wheel and the right rear wheel and their average value can be utilized to control the related factors.

As described above, according to the present invention, the desired speed change can be obtained not only by means of the manual switch by the driver but also the speed change programs can be automatically switched over correspondingly with the variation of the load with the result that, even if a large variation in the weight of the passengers or in the weight of the freight occurs, the most proper speed change step having the most desirable acceleration characteristics and fuel economy can be selected without a manual manipulation of switches.

What is claimed is:

1. A controlling device for an automatic speed change mechanism of an automobile comprising:
   - a speed change mechanism installed between a driving output shaft and a driving source disposed in an automobile and having speed change means for selecting speed change steps for converting into a plurality of reduction ratios the ratios between the input shaft and the output shaft;
   - an automobile speed detecting means for emitting electric signals in response to the speed of the automobile;
   - a throttle detection means for emitting electric signals in response to an increase of power of said driving source;
   - at least one automatic load response automobile height detecting means for emitting electric signals analogous to the distance between a road surface and a body of the automobile; and
   - an electronic controlling means connected to said speed change mechanism, said speed detecting means, said throttle detecting means and said height detecting means, said electronic controlling means having a plurality of predetermined speed change programs indicating the relationship between the automobile speed detected by said automobile speed detecting means, the increase of the driving power detected by said throttle detecting means and the speed change steps whereby said electronic controlling means is operative, based on a selected speed change program to control the speed change means of said speed change mechanism and is operative to select a different speed change program in response to a variation of the automobile height detected by said height detection means.

2. A controlling device as set forth in claim 1, wherein four automatic load responsive automobile height detecting means are provided, each height detecting means being comprised of a shock absorber having pressure sensor means for emitting said electric signals.

3. A controlling device as claimed in claim 1, wherein said electronic controlling means checks the difference between the preceding maximum automobile height detected by the height detecting means and the current automobile height, and based on this data, selects the proper speed change program.

4. A controlling device as claimed in claim 1, wherein said electronic controlling means checks the difference between the current automobile height and the average value of the preceding heights detected by said automobile height detection means, and based on this data, selects the proper speed change program.

5. A controlling device as claimed in claim 1, wherein said electronic controlling means is provided with a warning means and if a sudden variation of the automobile height occurs during the running of the automobile and if the varied height is not restored as detected by the height detection, means, said warning means is actuated.

6. A controlling device as claimed in claim 1, wherein said electronic controlling means is provided with a warning means and if the difference between the current automobile height and a preceding maximum height detected by the automobile height detection means exceeds a certain predetermined value, said warning means is activated.

* * * * *